(12) United States Patent
Guan et al.

(10) Patent No.: US 12,155,040 B2
(45) Date of Patent: Nov. 26, 2024

(54) STANDING DEVICE

(71) Applicant: CONTEMPORARY AMPEREX TECHNOLOGY (HONG KONG) LIMITED, Hong Kong (CN)

(72) Inventors: Feng Guan, Ningde (CN); Hongyan Liao, Ningde (CN); Zhihui Wang, Ningde (CN); Fenggang Zhao, Ningde (CN); Jun Ni, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/614,572

(22) Filed: Mar. 22, 2024

(65) Prior Publication Data

US 2024/0234820 A1 Jul. 11, 2024

Related U.S. Application Data

(63) Continuation of application No. PCT/CN2023/073629, filed on Jan. 29, 2023.

(30) Foreign Application Priority Data

Mar. 22, 2022 (CN) .......................... 202220630077.7

(51) Int. Cl.
*H01M 10/05* (2010.01)
*H01M 10/04* (2006.01)
(Continued)

(52) U.S. Cl.
CPC ..... *H01M 10/058* (2013.01); *H01M 10/0481* (2013.01); *H01M 10/4207* (2013.01);
(Continued)

(58) Field of Classification Search
CPC .......... H01M 10/058; H01M 10/0481; H01M 10/0468; H01M 10/0583; H01M 10/4207;
(Continued)

(56) References Cited

U.S. PATENT DOCUMENTS

| | | | |
|---|---|---|---|
| 9,847,527 B2 * | 12/2017 | Lu | .......................... H01M 4/136 |
| 2006/0216591 A1 * | 9/2006 | Lee | ...................... H01M 10/425 |
| | | | 429/176 |
| 2024/0162558 A1 * | 5/2024 | Su | ........................ H01M 50/375 |

FOREIGN PATENT DOCUMENTS

| | | |
|---|---|---|
| CN | 1705147 A | 12/2005 |
| CN | 104241592 A | 12/2014 |

(Continued)

OTHER PUBLICATIONS

The World Intellectual Property Organization (WIPO) International Search Report and Written Opinion for PCT/CN2023/073629 May 19, 2023 13 Pages (including translation).

*Primary Examiner* — Raymond Alejandro
(74) *Attorney, Agent, or Firm* — ANOVA LAW GROUP, PLLC (57) ABSTRACT

A standing device for letting a battery cell stand includes: a pressure regulating apparatus; a standing cavity; a charging cavity, connected to a first end of the standing cavity, the charging cavity being connected to the pressure regulating apparatus; a conveying apparatus, penetratingly disposed in the standing cavity and the charging cavity and configured to convey the battery cell; and a charging cavity sealing gate, disposed between the charging cavity and the standing cavity, the charging cavity sealing gate being configured to be opened when the pressure in the charging cavity rises to the pressure in the standing cavity, so that the battery cell is conveyed to the standing cavity.

13 Claims, 5 Drawing Sheets

(51) Int. Cl.
  H01M 10/058 (2010.01)
  H01M 10/42 (2006.01)
  H01M 10/44 (2006.01)
  H01M 50/636 (2021.01)
  H02J 7/00 (2006.01)

(52) U.S. Cl.
  CPC ....... H01M 10/441 (2013.01); H01M 10/445 (2013.01); H01M 10/446 (2013.01); H01M 50/636 (2021.01); H02J 7/0013 (2013.01); H02J 7/0069 (2020.01)

(58) Field of Classification Search
  CPC ............. H01M 10/441; H01M 10/445; H01M 10/446; H01M 50/636; H02J 7/0069; H02J 7/0013
  See application file for complete search history.

(56) References Cited

FOREIGN PATENT DOCUMENTS

| | | |
|---|---|---|
| CN | 204230343 U | 3/2015 |
| CN | 208738350 U | 4/2019 |
| CN | 109935882 A | 6/2019 |
| CN | 208970623 U | 6/2019 |
| CN | 209374552 U | 9/2019 |
| CN | 111063857 A | 4/2020 |
| CN | 210516858 U | 5/2020 |
| CN | 113555651 A | 10/2021 |
| CN | 217485681 U | 9/2022 |
| JP | H1145700 A | 2/1999 |

* cited by examiner

STANDING DEVICE

CROSS-REFERENCE TO RELATED APPLICATIONS

The present application is a continuation of International Application No. PCT/CN2023/073629, filed on Jan. 29, 2023, which claims priority to Chinese patent application Ser. No. 202220630077.7 filed on Mar. 22, 2022 and entitled "STANDING DEVICE", the entire contents of both of which are incorporated herein by reference.

TECHNICAL FIELD

The present application relates to the technical field of batteries, and more specifically, to a standing device.

BACKGROUND

With the increasing severity of environmental pollution, the new energy industry is receiving more and more attention from people. The battery technology is an important factor related to the development of the new energy industry.

In the existing production process of a battery cell, it is needed to use a standing device to let the battery cell stand to fully soak electrode assemblies in the battery cell by an electrolyte. Therefore, how to provide a standing device which can reduce the energy consumption of the standing device while guaranteeing the performance of the battery cell is an urgent problem to be solved in the battery technology.

SUMMARY

An embodiment of the present application provides a standing device which can reduce the energy consumption of the standing device while guaranteeing the performance of a battery cell.

According to a first aspect, a standing device is provided for letting a battery cell stand, comprising: a pressure regulating apparatus; a standing cavity; a charging cavity, connected to a first end of the standing cavity, the charging cavity being connected to the pressure regulating apparatus; a conveying apparatus, penetratingly disposed in the standing cavity and the charging cavity and configured to convey the battery cell; and a charging cavity sealing gate, disposed between the charging cavity and the standing cavity, the charging cavity sealing gate being configured to be opened when the pressure in the charging cavity rises to the pressure in the standing cavity, so that the battery cell is conveyed to the standing cavity.

In the embodiment of the present application, the charging cavity is connected to the standing cavity. When the pressure in the charging cavity is raised to the same pressure in the standing cavity through the pressure regulating apparatus, the charging cavity sealing gate is opened, and the battery cell is conveyed from the charging cavity to the standing cavity through the conveying apparatus to stand. The battery cell which stands in a stable pressure environment has good consistency, and the performance of the battery cell can be guaranteed. After the pressure in the charging cavity is raised to the pressure in the standing cavity, the battery cell is moved into the standing cavity. In this way, during the process of conveying the battery cell from the charging cavity to the standing cavity, the pressure in the standing cavity will not change, so there is no need to supplement additional pressure to the standing cavity, which can reduce the energy consumption of the standing device. Therefore, by means of the technical solutions in the embodiments of the present application, the energy consumption of the standing device can be reduced while the performance of the battery cell is guaranteed.

In a possible implementation, the charging cavity sealing gate is configured to be closed after the battery cell is conveyed to the standing cavity, and the charging cavity is configured to be depressurized after the charging cavity sealing gate is closed; and the standing device further comprises: a charging sealing cover, the charging sealing cover being disposed at an end of the charging cavity away from the standing cavity, and the charging sealing cover being configured to be opened after the pressure in the charging cavity is reduced, so as to put in the battery cell. In this way, the sealing performance between the standing cavity and the charging cavity can be guaranteed, and the reduction of pressure in the standing cavity caused by insufficient sealing during the pressure reduction process of the charging cavity can be prevented, so that the pressure in the standing cavity can be maintained to prevent the change in pressure in the standing cavity that may require additional energy to maintain the pressure in the standing cavity. After the pressure in the charging cavity is reduced, the pressure difference between the inside of the charging cavity and the outside of the standing device is smaller, thus facilitating the opening of the charging sealing cover.

In a possible implementation, the standing device further comprises: a discharging cavity, connected to a second end of the standing cavity, the discharging cavity being connected to the pressure regulating apparatus; and a discharging cavity sealing gate, disposed between the standing cavity and the discharging cavity, the discharging cavity sealing gate being configured to be opened when the pressure in the discharging cavity rises to the pressure in the standing cavity, so as to convey the battery cell to the discharging cavity. In this way, during the process of conveying the battery cell from the standing cavity to the discharging cavity, the pressure in the standing cavity will not change, so there is no need to supplement additional pressure to the standing cavity, which can reduce the energy consumption of the standing device. Furthermore, after the standing of the battery cell in the standing cavity is completed, when the pressure in the discharging cavity is equal to the pressure in the standing cavity, it is only needed to convey the battery cell from the standing cavity to the discharging cavity, close the discharging cavity sealing gate, and then remove the battery cell from the discharging cavity; and it is not necessary to remove the battery cell from the standing cavity after discharging the high pressure in the standing cavity, thus further reducing the energy consumption of the standing device.

In a possible implementation, the discharging cavity sealing gate is configured to be closed after the battery cell is conveyed to the discharging cavity, and the discharging cavity is configured to be depressurized after the discharging cavity sealing gate is closed; and the standing device further comprises: a discharging sealing cover, the discharging sealing cover being disposed at an end of the discharging cavity away from the standing cavity, and the discharging sealing cover being configured to be opened after the pressure in the discharging cavity is reduced, so as to remove the battery cell. In this way, the sealing performance between the standing cavity and the discharging cavity can be guaranteed, and the reduction of pressure in the standing cavity caused by insufficient sealing during the pressure reduction process of the discharging cavity can be prevented, so that the pressure in the standing cavity can be maintained to prevent the change in pressure in the standing cavity that may require additional energy to maintain the pressure in the standing cavity. After the pressure in the discharging cavity is reduced, the pressure difference between the inside of the discharging cavity and the outside of the standing device is smaller, thus facilitating the opening of the discharging sealing cover.

In a possible implementation, the standing device further comprises: a pressure recovery apparatus, the pressure recovery apparatus being in communication with the charging cavity and the discharging cavity respectively, so as to recover high pressure from one of the charging cavity and the discharging cavity to the other one. The pressure recovery apparatus can recover the high pressure in the charging cavity to the discharging cavity, and can also recover the high pressure in the discharging cavity to the charging cavity. In this way, the recovery and reuse of high-pressure gas can be achieved, and the energy consumption of the standing device can be reduced.

In a possible implementation, the charging cavity sealing gate comprises: a gate body, the gate body being connected to the charging cavity and the standing cavity respectively, and the gate body being provided with a first opening in communication with the charging cavity and the standing cavity; and a gate plate, movably disposed on the gate body and corresponding to the first opening, and configured to open or close the first opening. When the battery cell is conveyed from the charging cavity to the standing cavity, the gate plate rises and is opened, so that the battery cell enters the standing cavity from the charging cavity through the first opening. After the battery cell enters the standing cavity, the gate plate descends and is closed to achieve the isolation and sealing between the charging cavity and the standing cavity, which can prevent pressure leakage from the standing cavity to the charging cavity, thus guaranteeing the pressure stability in the standing cavity.

In a possible implementation, the conveying apparatus comprises a first sub-conveying apparatus and a second sub-conveying apparatus, and the first sub-conveying apparatus and the second sub-conveying apparatus are threaded in the charging cavity and the standing cavity respectively, wherein the first sub-conveying apparatus and the second sub-conveying apparatus are disposed at an interval to avoid the gate plate. The first sub-conveying apparatus and the second sub-conveying apparatus are disposed at an interval, that is, the first sub-conveying apparatus and the second sub-conveying apparatus are disposed separately. In this way, the gate plate can be disposed at a gap, so that the conveying apparatus can avoid the gate plate to guarantee the sealing between the gate plate and the first opening.

In a possible implementation, the volume of the standing cavity is 1-20 times the volume of the charging cavity. In this way, compared to the standing cavity, the charging cavity with a smaller volume has a higher pressure rise speed and less energy consumption during pressure rise, so that the production efficiency can be accelerated, and the energy consumption can also be reduced. Furthermore, due to a longer standing time of the battery cell, the number of standing of battery cells can be increased by increasing the volume of the standing cavity, so as to accelerate the production efficiency.

In a possible implementation, the standing cavity is a segmented structure. In this way, the number of segments of the standing cavity can be set according to actual needs, and the number of standing battery cells can be increased by increasing the number of segments of the standing cavity. Furthermore, because the volume of the standing cavity is related to the number of segments of the standing cavity, the number of segments of the standing cavity can be flexibly set according to the required standing time of the battery cell. In addition, when the size of each segment of the standing cavity is the same, it is also possible to achieve replacement instead of repair of the standing cavity to avoid the production pause caused by faults in the standing cavity, thus being beneficial for improving the production efficiency.

In a possible implementation, the charging cavity and the standing cavity are cylindrical. In this way, forces applied in the charging cavity and the standing cavity are uniform. Compared to a square charging cavity and a square standing cavity, the cylindrical charging cavity and the cylindrical standing cavity require a smaller thickness on the premise of meeting strength, thus being beneficial for reducing the cost.

In a possible implementation, the standing device further comprises: a tray clamp, disposed on the conveying apparatus and configured to place the battery cell. The battery cell can be conveyed and transported conveniently by disposing the tray clamp.

In a possible implementation, the tray clamp comprises: a liquid injection mechanism, a liquid discharge port of the liquid injection mechanism being configured to align with a liquid injection port of the battery cell, so as to inject an electrolyte into the battery cell; and a liquid injection clamp, the liquid injection clamp being configured to clamp the battery cell and the liquid injection mechanism. In this way, during the standing process of the battery cell, the liquid injection mechanism can continue to inject the electrolyte into the battery cell, so that the content of the electrolyte in the battery cell can be increased.

In a possible implementation, an end of the liquid discharge port close to the liquid injection port is provided with a sealing member. In this way, the electrolyte can be prevented from leaking from a joint between the liquid discharge port and the liquid injection port.

In the embodiment of the present application, the charging cavity is connected to the standing cavity. When the pressure in the charging cavity is raised to the same pressure in the standing cavity through the pressure regulating apparatus, the charging cavity sealing gate is opened, and the battery cell is conveyed from the charging cavity to the standing cavity through the conveying apparatus to stand. In this way, the battery cell which stands in a stable pressure environment has good consistency, and the performance of the battery cell can be guaranteed. After the pressure in the charging cavity is raised to the pressure in the standing cavity, the battery cell is moved into the standing cavity. In this way, during the process of conveying the battery cell from the charging cavity to the standing cavity, the pressure in the standing cavity will not change, so there is no need to supplement additional pressure to the standing cavity, which can reduce the energy consumption of the standing device. Therefore, by means of the technical solutions in the embodiments of the present application, the energy consumption of the standing device can be reduced while the performance of the battery cell is guaranteed.

DESCRIPTION OF DRAWINGS

In order to illustrate the technical solutions in the embodiments of the present application more clearly, the following briefly introduces the drawings required in the embodiments of the present application. Obviously, the drawings described below are only some embodiments of the present application. For those of ordinary skill in the art, other drawings can also be obtained according to these drawings without any creative effort.

DETAILED DESCRIPTION

Technical solutions in the embodiments of the present application are described below with reference to the drawings.

The implementations of the present application are further described in detail below with reference to the drawings and embodiments. The following detailed description of the embodiments and the drawings are used to illustrate the principles of the present application by way of example, but should not be used to limit the scope of the present application, that is, the present application is not limited to the described embodiments.

In the description of the present application, it should be noted that unless otherwise stated, all technical and scientific terms used herein have the same meanings as commonly understood by those skilled in the art of the present application. The terms used herein are intended only for the purpose of describing specific embodiments and are not intended to limit the present application. The terms "comprise" and "have" and any variations thereof in the specification and claims of the present application as well as in the above description of drawings are intended to cover a non-exclusive inclusion; the term "a plurality of" means two or more; and the orientation or position relationships indicated by the terms "upper", "lower", "left", "right", "inner", "outer" and the like are only for facilitating the description of the present application and simplifying the description, rather than indicating or implying that the apparatus or element referred to must have a specific orientation or be constructed and operated in a specific orientation, and therefore will not be interpreted as limiting the present application. In addition, the terms "first", "second", "third", and the like are used for descriptive purposes only, and cannot be construed as indicating or implying relative importance. "Vertical" is not strictly vertical, but within an allowable range of an error. "Parallel" is not strictly parallel, but within an allowable range of an error.

The reference to "embodiments" in the present application means that specific features, structures or characteristics described with reference to embodiments may be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described in the present application may be combined with other embodiments.

Orientation words appearing in the following description are all directions shown in the drawings, and do not limit the specific structure of the present application. In the description of the present application, it should also be noted that unless otherwise expressly specified and defined, the terms "install", "connnected" and "connect" should be understood in a broad sense. For example, the connection may be fixed connection, detachable connection or integrated connection, or may be direct connection, indirect connection through an intermediate, or internal communication of two elements. Those of ordinary skill in the art can understand the specific meanings of the above terms in the present application according to specific situations.

In the present application, the term "and/or" only describes an association relationship between associated objects and represents that three relationships may exist. For example, A and/or B may represent three situations: A exists alone, both A and B exist, and B exists alone. In addition, the character "/" in the present application generally means that the associated objects before and after it are in an "or" relationship.

In the existing production processes of a battery cell, after an electrode assembly is made, processes, such as liquid injection, standing and formation, need to be performed to form a final battery cell. The standing of the battery cell is a very important technological operation. After standing, the electrode assembly can be fully soaked by an electrolyte to increase the consistency of a subsequent formation interface, thus improving the performance of the battery cell. In this way, a standing device is crucial for the standing of the battery cell, but the standing device often generates higher energy consumption. Therefore, how to reduce the energy consumption of the standing device while guaranteeing the performance of the battery cell is an urgent problem to be solved.

In view of this, an embodiment of the present application provides a standing device for letting a battery cell stand. The standing device comprises a charging cavity and a standing cavity, wherein the charging cavity is connected to the standing cavity. When the pressure in the charging cavity is raised to the same pressure in the standing cavity through a pressure regulating apparatus, a charging cavity sealing gate is opened, and the battery cell is conveyed from the charging cavity to the standing cavity through a conveying apparatus to stand. In this way, the battery cell which stands in a stable pressure environment has good consistency, and the performance of the battery cell can be guaranteed. After the pressure in the charging cavity is raised to the pressure in the standing cavity, the battery cell is moved into the standing cavity. In this way, during the process of conveying the battery cell from the charging cavity to the standing cavity, the pressure in the standing cavity will not change, so there is no need to supplement additional pressure to the standing cavity, which can reduce the energy consumption of the standing device. Therefore, by means of the technical solutions in the embodiments of the present application, the energy consumption of the standing device can be reduced while the performance of the battery cell is guaranteed.

Figure 1:
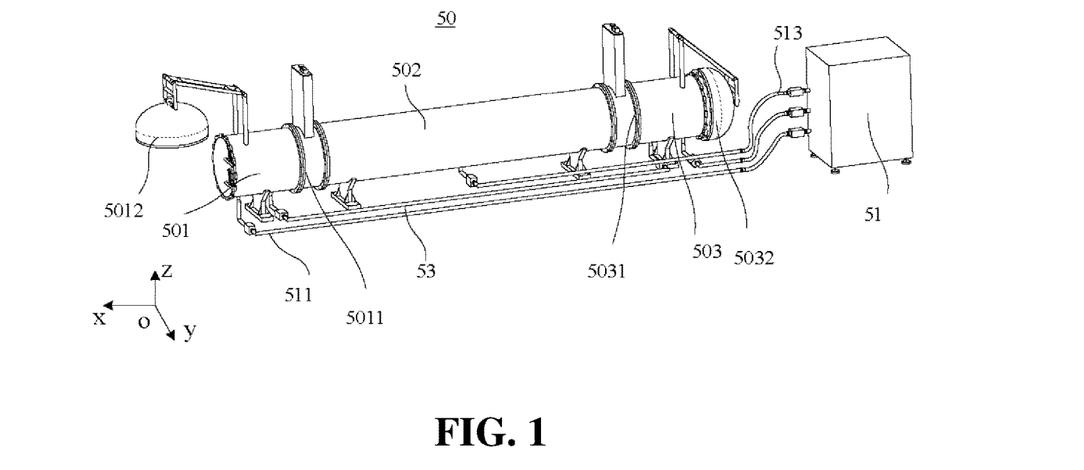
FIG. 1 is a schematic view of a standing device according to some embodiments of the present application.
Figure 2:
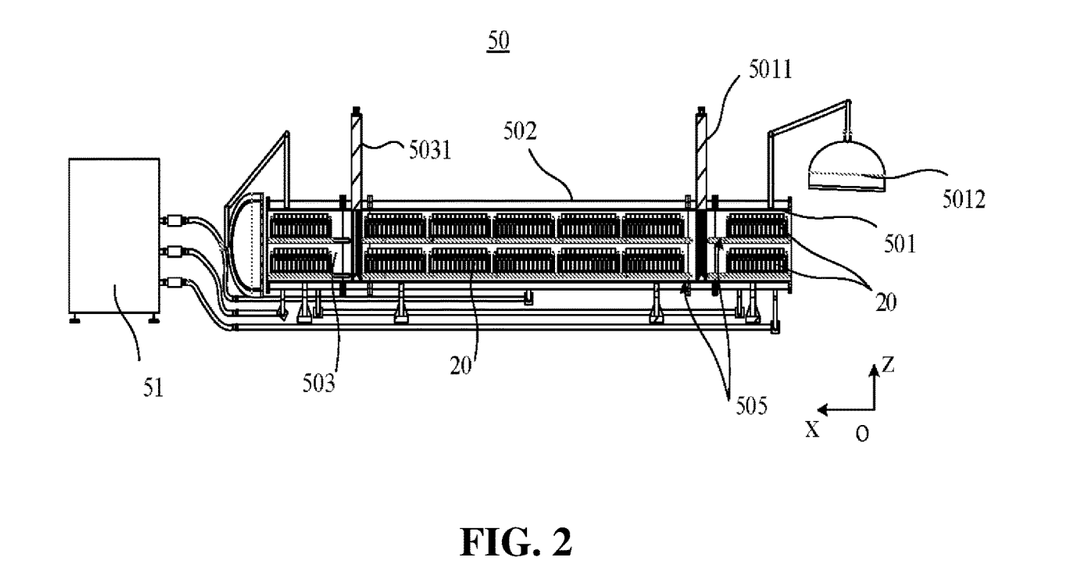
FIG. 2 is a cross-sectional view of the standing device according to some embodiments of the present application.

FIG. 1 shows a schematic structural view of a standing device according to some embodiments of the present application, and FIG. 2 shows a schematic view of a cross-sectional structure of the standing device according to some embodiments of the present application. The standing device 50 is configured to let a battery cell 20 stand. As shown in FIG. 1 and FIG. 2, the standing device 50 comprises: a pressure regulating apparatus 51; a standing cavity 502; a charging cavity 501, connected to a first end of the standing cavity 502, the charging cavity 501 being connected to the pressure regulating apparatus 51; a conveying apparatus 505, penetratingly disposed in the standing cavity 502 and the charging cavity 501 and configured to convey the battery cell 20; and a charging cavity sealing gate 5011, disposed between the charging cavity 501 and the standing cavity 502, the charging cavity sealing gate 5011 being configured to be opened when the pressure in the charging cavity 501 rises to the pressure in the standing cavity 502, so that the battery cell 20 is conveyed to the standing cavity 502.

The battery cell 20 may comprise a lithium-ion secondary battery, a lithium-ion primary battery, a lithium-sulfur battery, a sodium/lithium-ion battery, a sodium-ion battery, a magnesium-ion battery, or the like, which is not limited in the embodiments of the present application. The battery cell 20 may be cylindrical, flat, rectangular, or in other shapes, which is also not limited in the embodiments of the present application. The battery cell 20 may be divided into a cylindrical battery cell, a square battery cell, or a pouch cell according to an encapsulating manner, which is also not limited in the embodiments of the present application.

The pressure regulating apparatus 51 is a device for regulating pressure. In some embodiments, the pressure regulating apparatus 51 may be configured to regulate the pressure of the standing device 50. Specifically, the pressure regulating apparatus 51 may be connected to the charging cavity 501 through a first pipeline 511 to regulate the pressure in the charging cavity 501. Optionally, the pressure regulating apparatus 51 may be an air compressor.

The standing cavity 502 is configured to let the battery cell 20 stand. In some embodiments, before the standing device 50 operates, the pressure in the standing cavity 502 is P0. During the initial operation phase of the standing device 50, the pressure regulating apparatus 51 supplements pressure to the standing cavity 502, so that the pressure in the standing cavity 502 reaches the target pressure P1, wherein the value of P1 may be regulated according to actual needs. For example, P1 may be 1.2 MPa, and P0 may be standard atmospheric pressure. After the official operation of the standing device 50, the pressure in the standing cavity 502 is maintained at P1, and at this time, the battery cell 20 can stand in the standing cavity 502. Because the pressure in the standing cavity 502 is maintained at P1, in this way, the battery cell 20 stands under stable pressure, which can guarantee that each battery cell 20 absorbs the electrolyte to the same extent, so as to be beneficial for improving the consistency of the battery or battery cell 10.

The charging cavity 501 is connected to the first end of the standing cavity 502, and the first end may be an end of the standing cavity 502 close to the charging cavity 501 along the conveying direction of the battery cell 20.

Figure 3:
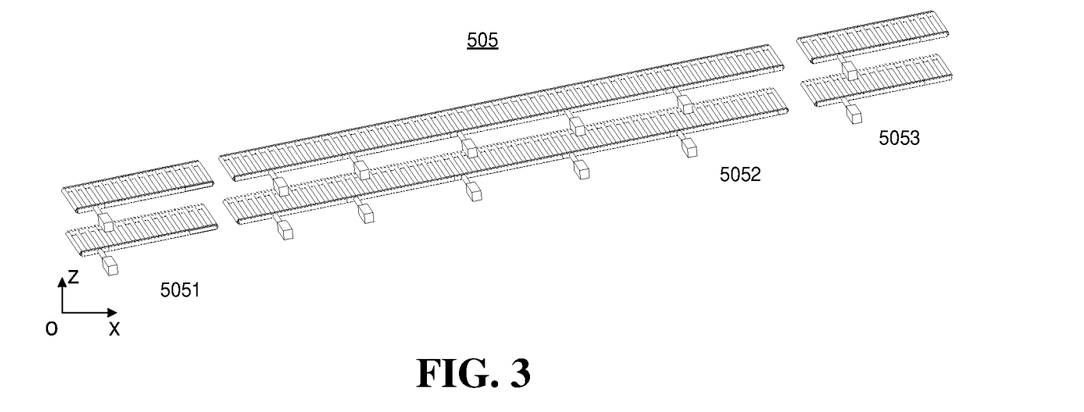
FIG. 3 is a schematic view of a conveying apparatus according to some embodiments of the present application.

FIG. 3 is a schematic structural view of a conveying apparatus according to some embodiments of the present application. With reference to FIG. 2 and FIG. 3, the conveying apparatus 505 is penetratingly disposed between the charging cavity 501 and the standing cavity 502 and may be configured to convey the battery cell 20. Optionally, the conveying apparatus 505 may be a roller-shaped conveying apparatus extending along an x direction, that is, the conveying apparatus 505 is composed of a plurality of roller-shaped units.

In the embodiments of the present application, the charging cavity 501 is connected to the standing cavity 502. When the pressure in the charging cavity 501 is raised to the same pressure in the standing cavity 502 through the pressure regulating apparatus 51, the charging cavity sealing gate 5011 is opened, and the battery cell 20 is conveyed from the charging cavity 501 to the standing cavity 502 through the conveying apparatus to stand. In this way, the battery cell 20 has good consistency, and the performance of the battery cell 20 can be guaranteed. After the pressure in the charging cavity 501 is raised to the pressure in the standing cavity 502, the battery cell 20 is moved into the standing cavity 502. In this way, during the process of conveying the battery cell 20 from the charging cavity 501 to the standing cavity 502, the pressure in the standing cavity 502 will not change, so there is no need to supplement additional pressure to the standing cavity 502, which can reduce the energy consumption of the standing device 50. Therefore, by means of the technical solutions in the embodiments of the present application, the energy consumption of the standing device 50 can be reduced while the performance of the battery cell 20 is guaranteed.

Optionally, in some embodiments of the present application, the charging cavity sealing gate 5011 is configured to be closed after the battery cell 20 is conveyed to the standing cavity 502, and the charging cavity 501 is configured to be depressurized after the charging cavity sealing gate 5011 is closed; and the standing device 50 further comprises: a charging sealing cover 5012, the charging sealing cover 5012 being disposed at an end of the charging cavity 501 away from the standing cavity 502, and the charging sealing cover 5012 being configured to be opened after the pressure in the charging cavity 501 is reduced, so as to put in the battery cell 20.

After the battery cell 20 is conveyed from the charging cavity 501 to the standing cavity 502, the charging cavity sealing gate 5011 is closed, and the pressure in the charging cavity 501 is reduced. In this way, the leakage of high pressure in the standing cavity 502 caused by insufficient sealing between the charging cavity 501 and the standing cavity 502 can be prevented, so that the pressure in the standing cavity 502 can be maintained to avoid the energy loss caused by additional supplementation of pressure to the standing cavity 502.

After the charging cavity sealing gate 5011 is closed, the pressure in the charging cavity 501 is reduced. In some embodiments, the pressure in the charging cavity 501 may be reduced continuously after the charging sealing cover 5012 is opened. For example, part of the high pressure in the charging cavity 501 is discharged before the charging sealing cover 5012 is opened; and after the charging sealing cover 5012 is opened, the high pressure in the charging cavity 501 is completely discharged, and the pressure in the charging cavity 501 is reduced to normal pressure. In some other embodiments, the charging cavity 501 may be provided with an exhaust port; after the charging cavity sealing gate 5011 is closed, the high pressure in the charging cavity 501 may be completely discharged through the exhaust port, so that the pressure in the charging cavity 501 is reduced to normal pressure, wherein part of the high pressure in the charging cavity 501 may be discharged first through other apparatuses, and then, the remaining high pressure is discharged through the exhaust port; and the high pressure in the charging cavity 501 may also be completely discharged only through the exhaust port until the pressure in the charging cavity 501 is reduced to normal pressure. The embodiments of the present application do not impose specific restrictions on this.

The charging sealing cover 5012 is opened when the battery cell 20 enters the charging cavity 501 and is closed after the battery cell 20 enters the charging cavity 501, thus being convenient to increase the pressure in the charging cavity 501. When the pressure in the charging cavity 501 rises to the pressure in the standing cavity 502, the charging cavity sealing gate 5011 is opened, and the battery cell 20 enters the standing cavity 502 from the charging cavity 501; and after the battery cell 20 enters the standing cavity 502, the charging cavity sealing gate 5011 is closed. At this time, in some embodiments, at least part of the high pressure in the charging cavity 501 is discharged, the charging sealing cover 5012 is opened, and the pressure in the charging cavity 501 is further reduced to normal pressure; and after the pressure in the charging cavity 501 is reduced to normal pressure, the next set of battery cells 20 are put in the charging cavity 501 to let the next set of battery cells 20 stand. In some other embodiments, at least part of the high pressure in the charging cavity 501 is discharged, and the remaining high pressure in the charging cavity 501 is discharged out of the charging cavity 501 through the exhaust port; and after the pressure in the charging cavity 501 is reduced to normal pressure, the charging sealing cover 5012 is opened, and the next set of battery cells 20 are put in the charging cavity 501 to let the next set of battery cells 20 stand.

Optionally, in some embodiments of the present application, the standing device 50 further comprises: a discharging cavity 503, connected to a second end of the standing cavity 502, the discharging cavity 503 being connected to the pressure regulating apparatus 51; and a discharging cavity sealing gate 5031, disposed between the standing cavity 502 and the discharging cavity 503, the discharging cavity sealing gate 5031 being configured to be opened when the pressure in the discharging cavity 503 rises to the pressure in the standing cavity 502, so as to convey the battery cell 20 to the discharging cavity 503.

The discharging cavity 503 is connected to the second end of the standing cavity 502, and the second end may be an end of the standing cavity 502 away from the charging cavity 501 along the conveying direction of the battery cell 20.

The pressure regulating apparatus 51 may also be connected to the discharging cavity 503 through a second pipeline 512 to regulate the pressure in the discharging cavity 503, for example, to increase the pressure in the discharging cavity 503.

The discharging cavity sealing gate 5031 is disposed between the standing cavity 502 and the discharging cavity 503. When the pressure in the discharging cavity 503 rises to the same pressure in the standing cavity 502, the discharging cavity sealing gate 5031 is opened to enable the battery cell 20 to be removed to the standing cavity 502. In this way, the pressure in the standing cavity 502 is the same as the pressure in the discharging cavity 503. When the discharging cavity sealing gate 5031 is opened, the pressure in the standing cavity 502 will not change. Furthermore, after the standing of the battery cell 20 is completed, it is only needed to convey the battery cell 20 from the standing cavity 502 to the discharging cavity 503, close the discharging cavity sealing gate 5031, and then remove the battery cell 20 from the discharging cavity 503. The pressure in the standing cavity 502 cannot be changed, the pressure in the standing cavity 502 can be always in a stable state, and there is no need for additional energy to increase the pressure in the standing cavity 502 after the pressure in the standing cavity 502 is reduced, thus further reducing the energy consumption.

Optionally, in some embodiments of the present application, the discharging cavity sealing gate 5031 is configured to be closed after the battery cell 20 is conveyed to the discharging cavity 503, and the discharging cavity 503 is configured to be depressurized after the discharging cavity sealing gate 5031 is closed; and the standing device 50 further comprises: a discharging sealing cover 5032, the discharging sealing cover 5032 being disposed at an end of the discharging cavity 503 away from the standing cavity 502, and the discharging sealing cover 5032 being configured to be opened after the pressure in the discharging cavity 503 is reduced, so as to remove the battery cell 20. In this way, the leakage of high pressure in the standing cavity 502 caused by removal of the battery cell 20 from the discharging cavity 503 can be avoided.

After the battery cell 20 is conveyed from the standing cavity 502 to the discharging cavity 503, the discharging cavity sealing gate 5031 is closed, and the pressure in the discharging cavity 503 is reduced. In this way, the leakage of high pressure in the standing cavity 502 caused by insufficient sealing between the discharging cavity 503 and the standing cavity 502 can be prevented, so that the pressure in the standing cavity 502 can be maintained to avoid the energy loss caused by additional supplementation of pressure to the standing cavity 502.

After the discharging cavity sealing gate 5031 is closed, the pressure in the discharging cavity 503 is reduced. In some embodiments, the pressure in the discharging cavity 503 may be reduced continuously after the discharging sealing cover 5032 is opened. For example, part of the high pressure in the discharging cavity 503 is discharged before the discharging sealing cover 5032 is opened; and after the discharging sealing cover 5032 is opened, the high pressure in the discharging cavity 503 is completely discharged, and the pressure in the discharging cavity 503 is reduced to normal pressure. In some other embodiments, the discharging cavity 503 may be provided with a gas outlet; after the discharging cavity sealing gate 5031 is closed, the high pressure in the discharging cavity 503 may be completely discharged through the gas outlet, so that the pressure in the discharging cavity 503 is reduced to normal pressure, wherein part of the high pressure in the discharging cavity 503 may be discharged first through other apparatuses, and then, the remaining high pressure is discharged through the gas outlet; and the high pressure in the discharging cavity 503 may also be completely discharged only through the gas outlet until the pressure in the discharging cavity 503 is reduced to normal pressure. The embodiments of the present application do not impose specific restrictions on this.

The discharging sealing cover 5032 is configured to be opened after the pressure in the discharging cavity 503 is reduced. At this time, the pressure difference between the inside of the discharging cavity 503 and the outside of the standing device 50 is smaller, or the internal pressure of the discharging cavity 503 is the same as the external pressure of the standing device 50, thus facilitating the opening of the discharging sealing cover 5032. After the discharging sealing cover 5032 is opened, the battery cell 20 after standing is removed from the discharging cavity 503.

Optionally, in some embodiments of the present application, the standing device 50 further comprises a pressure recovery apparatus 53. The pressure recovery apparatus 53 is in communication with the charging cavity 501 and the discharging cavity 503 respectively, so as to recover high pressure from one of the charging cavity 501 and the discharging cavity 503 to the other one.

Optionally, during the charging process of the battery cell 20, after the battery cell 20 is put in the charging cavity 501, the charging sealing cover 5012 is closed, the pressure regulating apparatus 51 regulates the pressure in the charging cavity 501 to be consistent with the pressure in the standing cavity 502, and at this time, the charging cavity sealing gate 5011 is opened to convey the battery cell 20 to the standing cavity 502. The pressure recovery apparatus 53 is configured to recover the pressure in the charging cavity 501 to the discharging cavity 503 after the battery cell 20 is moved from the charging cavity 501 to the standing cavity 502 and the charging cavity sealing gate 5011 is closed, so as to increase the pressure in the discharging cavity 503, and reduce the energy consumption required for the pressure rise of the discharging cavity 503 when the battery cell 20 is moved from the standing cavity 502 to the discharging cavity 503. On the one hand, the pressure in the charging cavity 501 can be reduced from P1 to P2 through the pressure recovery apparatus 53 to facilitate the opening of the charging sealing cover 5011, and the next set of battery cells 20 are put in the charging cavity 501 to let the next set of battery cells 20 stand. On the other hand, the pressure in the discharging cavity 503 can be increased from P0 to P2 through the pressure recovery apparatus 53, and at this time, the pressure regulating apparatus 51 supplements pressure to the discharging cavity 503 to enable the pressure in the discharging cavity 503 to be the same as the pressure in the standing cavity 502, so that the energy consumption of the pressure regulating apparatus 51 can be reduced. In this way, the recovery and reuse of the high pressure in the charging cavity 501 are achieved, and the pressure regulating apparatus 51 does not need to increase the pressure in the discharging cavity 503 from P0 to P1, thus further reducing the energy consumption.

Optionally, during the discharging process of the battery cell 20, the pressure regulating apparatus 51 regulates the pressure in the discharging cavity 503 to be consistent with the pressure in the standing cavity 502, and at this time, the discharging cavity sealing gate 5031 is opened to convey the battery cell 20 to the discharging cavity 503. The pressure recovery apparatus 53 is configured to recover the pressure in the discharging cavity 503 to the charging cavity 501 after the battery cell 20 is moved from the standing cavity 502 to the discharging cavity 503 and the discharging cavity sealing gate 5031 is closed, so as to increase the pressure in the charging cavity 501, and reduce the energy consumption required for the pressure rise of the charging cavity 501 when the battery cell 20 is conveyed from the charging cavity 501 to the standing cavity 502. On the one hand, the pressure in the discharging cavity 503 can be reduced from P1 to P3 through the pressure recovery apparatus 53 to facilitate the opening of the discharging sealing cover 5031, and the battery cell 20 after standing is removed from the discharging cavity 503. On the other hand, the pressure in the charging cavity 501 can be increased from P0 to P3 through the pressure recovery apparatus 53, and at this time, the pressure regulating apparatus 51 supplements pressure to the charging cavity 501 to enable the pressure in the charging cavity 501 to be the same as the pressure in the standing cavity 502, so that the energy consumption of the pressure regulating apparatus 51 can be reduced. In this way, the recovery and reuse of the high pressure in the discharging cavity 503 are achieved, and the pressure regulating apparatus 51 does not need to increase the pressure in the charging cavity 501 from P0 to P1, thus further reducing the energy consumption.

Optionally, the pressure recovery apparatus 53 may be a pressure recovery pipeline, and the pressure recovery pipeline is provided with a valve. When the valve is opened, the high pressure in the charging cavity 501 may enter the discharging cavity 503 through the pressure recovery pipeline, or the high pressure in the discharging cavity 503 may enter the charging cavity 501 through the pressure recovery pipeline, thus achieving the recovery and reuse of high-pressure gas. By disposing the pressure recovery pipeline, spontaneous balance of pressure in the charging cavity 501 and the discharging cavity 503 can be achieved, and the recovery and reuse of high pressure can be achieved without the need for additional power.

Figure 4:
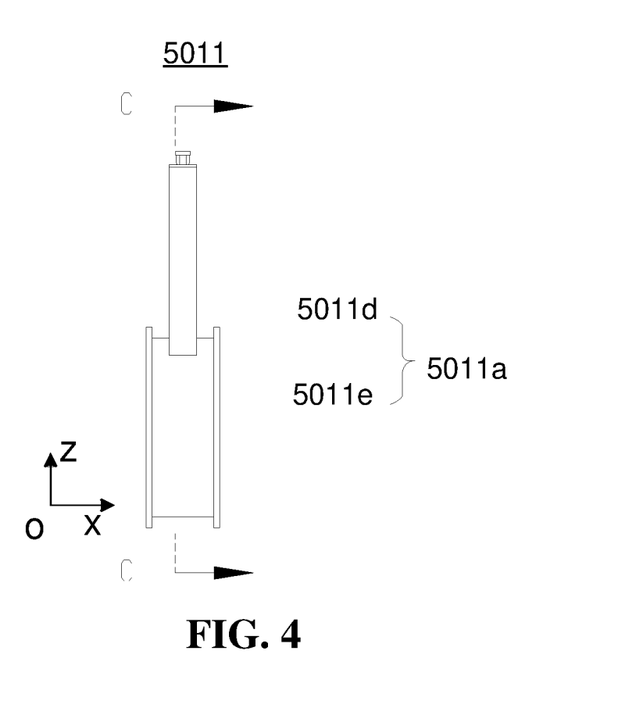
FIG. 4 is a schematic view of a charging cavity sealing gate according to some embodiments of the present application.
Figure 5:
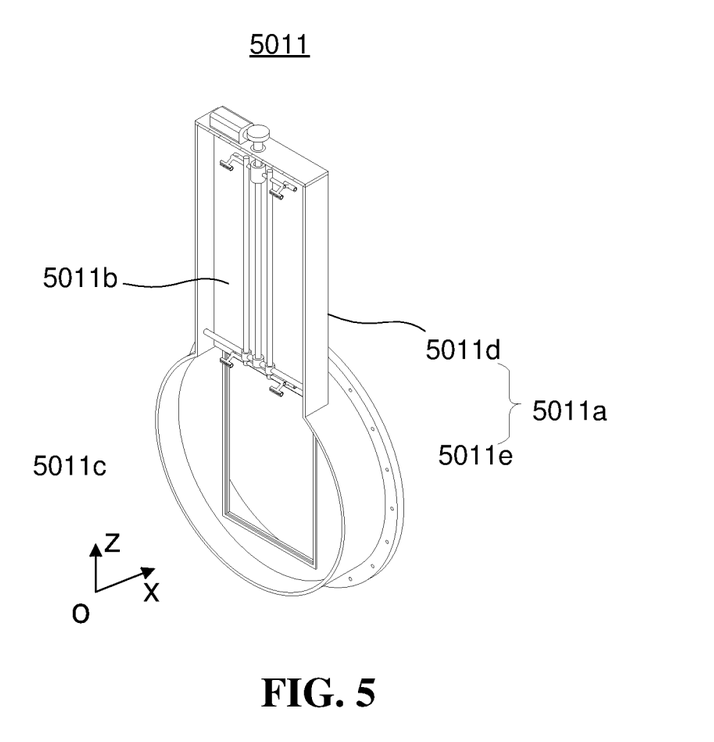
FIG. 5 is a schematic view of the charging cavity sealing gate in FIG. 4 when being opened along a direction C-C.
Figure 6:
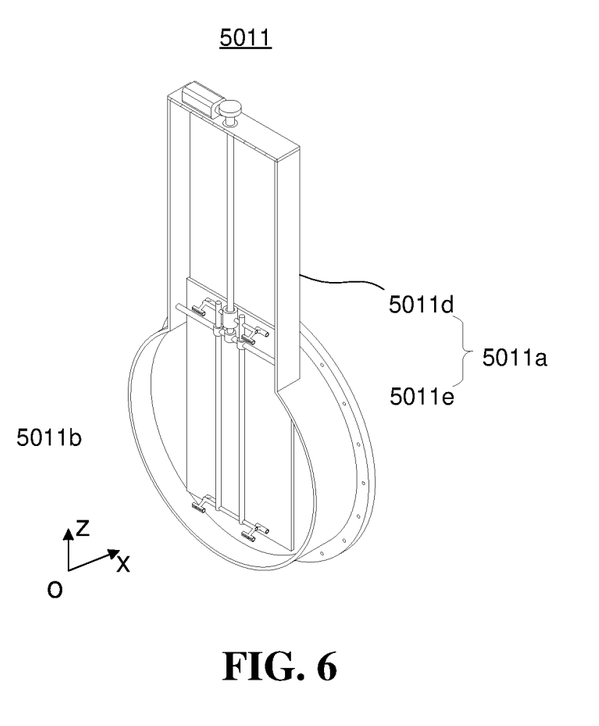
FIG. 6 is a schematic view of the charging cavity sealing gate in FIG. 4 when being closed along the direction C-C.

FIG. 4 is a schematic structural view of a charging cavity sealing gate according to some embodiments of the present application; FIG. 5 is a schematic structural view of the charging cavity sealing gate in FIG. 4 when being opened along a direction C-C; and FIG. 6 is a schematic structural view of the charging cavity sealing gate in FIG. 4 when being closed along the direction C-C. Optionally, in some embodiments of the present application, with reference to FIG. 4 to FIG. 6, the charging cavity sealing gate 5011 comprises a gate body 5011a and a gate plate 5011b. The gate body 5011a is connected to the charging cavity 501 and the standing cavity 502 respectively, and the gate body 5011a is provided with a first opening 5011c in communication with the charging cavity 501 and the standing cavity 502. The gate plate 5011b is movably disposed on the gate body 5011a and corresponds to the first opening 5011c, and is configured to open or close the first opening 5011c.

In some embodiments, the gate body 5011a may comprise a main body part 5011e and a protruding part 5011d which are connected to each other. The protruding part 5011d protrudes from the main body part 5011e along a radial direction of the main body part 5011e, and the protruding part 5011d is configured to accommodate the gate plate 5011b when the charging cavity sealing gate 5011 is opened, so as to prevent dust on the gate plate 5011b from causing jamming when the gate plate 5011b is moved or affecting the sealing performance between the gate plate 5011b and the first opening 5011c. The diameter of the main body part 5011e is greater than the diameter of the charging cavity 501 and the diameter of the standing cavity 502. The main body part 5011e of the gate body 5011a sleeves the charging cavity 501 and the standing cavity 502, so as to connect the charging cavity 501 and the standing cavity 502. Of course, in some other embodiments, the main body part 5011e of the gate body 5011a may also be connected to the charging cavity 501 and the standing cavity 502 by means of bolted connection, welding, or the like.

The gate plate 5011b is movably disposed on the gate body 5011a, and the gate plate 5011b can move along the radial direction of the main body part 5011e of the gate body 5011a to open or close the first opening 5011c. For example, in some embodiments, the gate plate 5011b can move relative to the gate body 5011a along the conveying direction perpendicular to the battery cell 20, namely the x direction, so as to open or close the first opening 5011c. In some other embodiments, the gate plate 5011b can move up and down relative to the gate body 5011a along a vertical direction, for example, a z direction, so as to open or close the first opening 5011c.

In some embodiments, the gate plate 5011b may be connected to a driving apparatus. Under the driving of the driving apparatus, when the charging cavity sealing gate 5011 is opened, the gate plate 5011b moves along the radial direction of the main body part 5011e of the gate body 5011a and is accommodated in the protruding part 5011d, so as to achieve the communication between the charging cavity 501 and the standing cavity 502, and the battery cell 20 can enter the standing cavity 502 through the first opening 5011c.

When the charging cavity sealing gate 5011 is closed, the gate plate 5011b is reset and can completely seal the first opening 5011c, so as to achieve the sealing between the charging cavity 501 and the standing cavity 502.

Optionally, the size of the gate plate 5011b may be greater than or equal to the size of the first opening 5011c, wherein the gate plate 5011b may be square, circular, or the like, and correspondingly, the first opening 5011c is also square, circular, or the like.

Optionally, in an embodiment of the present application, the discharging cavity sealing gate 5031 comprises a discharging cavity gate body and a discharging cavity gate plate, and the discharging cavity gate body and the discharging cavity gate plate may have the same structures as the gate body 5011a and the gate plate of the charging cavity sealing gate 5011, and are not repeated in the embodiment of the present application.

Optionally, in an embodiment of the present application, the conveying apparatus 505 comprises a first sub-conveying apparatus 5051 and a second sub-conveying apparatus 5052, and the first sub-conveying apparatus 5051 and the second sub-conveying apparatus 5052 are threaded in the charging cavity 501 and the standing cavity 502 respectively, wherein the first sub-conveying apparatus 5051 and the second sub-conveying apparatus 5052 are disposed at an interval to avoid the gate plate 5011a. The first sub-conveying apparatus 5051 and the second sub-conveying apparatus 5052 are disposed separately, that is, the first sub-conveying apparatus 5051 and the second sub-conveying apparatus 5052 are disposed at an interval. In this way, the gate plate 5011b can be disposed at a gap, so that the gate plate 5011b can seal the first opening 5011c, thus achieving the sealing function of the charging cavity sealing gate 5011. Therefore, by disposing the first sub-conveying apparatus 5051 and the second sub-conveying apparatus 5052 at an interval, the avoidance of the gate plate 5011b of the gate body 5011a is achieved, and the sealing between the gate plate 5011b and the first opening 5011c can be guaranteed.

Optionally, the conveying apparatus 505 further comprises a third sub-conveying apparatus 5053, the third sub-conveying apparatus 5053 is threaded in the discharging cavity 503, and the second sub-conveying apparatus 5052 and the third sub-conveying apparatus 5053 are disposed at an interval, so as to achieve the avoidance of the discharging cavity gate body to guarantee the sealing performance of the discharging cavity sealing gate 5031.

Optionally, the conveying apparatus 505 in the standing device 50 may be a multi-layer structure. For example, with reference to FIG. 5 and FIG. 6, the standing device 50 comprises two layers of conveying apparatuses 505 along a z direction. By disposing multiple layers of conveying apparatuses 505, the number of standing battery cells 20 in the standing device 50 can be increased.

Optionally, in some embodiments of the present application, the volume of the standing cavity 502 is 1-20 times the volume of the charging cavity 501. On the one hand, compared to the standing cavity 502, the charging cavity 501 with a smaller volume has a higher speed for increasing the pressure to P1 and less energy consumed by increasing the pressure, so that the production efficiency can be accelerated, and the energy consumption can also be reduced. On the other hand, when the battery cell 20 requires a longer standing time, the standing cavity 502 can accommodate more battery cells 20 by increasing the volume of the standing cavity 502, thus accelerating the production efficiency.

Optionally, in an embodiment of the present application, the standing cavity 502 is a segmented structure. For example, the volume of the charging cavity 501 is V1, the volume of the standing cavity 502 is n*V1, and the standing cavity 502 and the charging cavity 501 have the same cross-sectional area, wherein n represents the number of segments of the standing cavity 502. In this way, the number of segments of the standing cavity 502 can be set according to actual needs. When the battery cell 20 requires a shorter standing time, the volume of the standing cavity 502 can be reduced by reducing the number of segments of the standing cavity 502; and when the battery cell 20 requires a longer standing time, the volume of the standing cavity 502 can be increased by increasing the number of segments of the standing cavity 502, thus meeting the requirements of the battery cell 20 for different standing times. In addition, when a segment of the standing cavity 502 has a fault, due to the same volume and cross-sectional area of each standing cavity 502, the standing cavity 502 can be quickly replaced with a new standing cavity 502 to achieve replacement instead of repair to avoid the production pause caused by the fault in the standing cavity 502, thus being beneficial for improving the production efficiency.

Optionally, in an embodiment of the present application, the charging cavity 501 and the standing cavity 502 are cylindrical. In this way, forces applied in the charging cavity 501 and the standing cavity 502 are uniform. Compared to a square charging cavity 501 and a square standing cavity 502, the cylindrical charging cavity 501 and the cylindrical standing cavity 502 require a smaller thickness on the premise of meeting strength, thus being beneficial for reducing the cost.

Optionally, the discharging cavity 503 is also cylindrical, that is, the entire cavity of the standing device 50 is cylindrical.

Optionally, the standing device 50 is disposed horizontally, so the standing device 50 can save the space in a height direction. Furthermore, compared to vertical disposition, the energy consumption for conveying the battery cell 20 by the conveying apparatus can also be further reduced.

Figure 7:
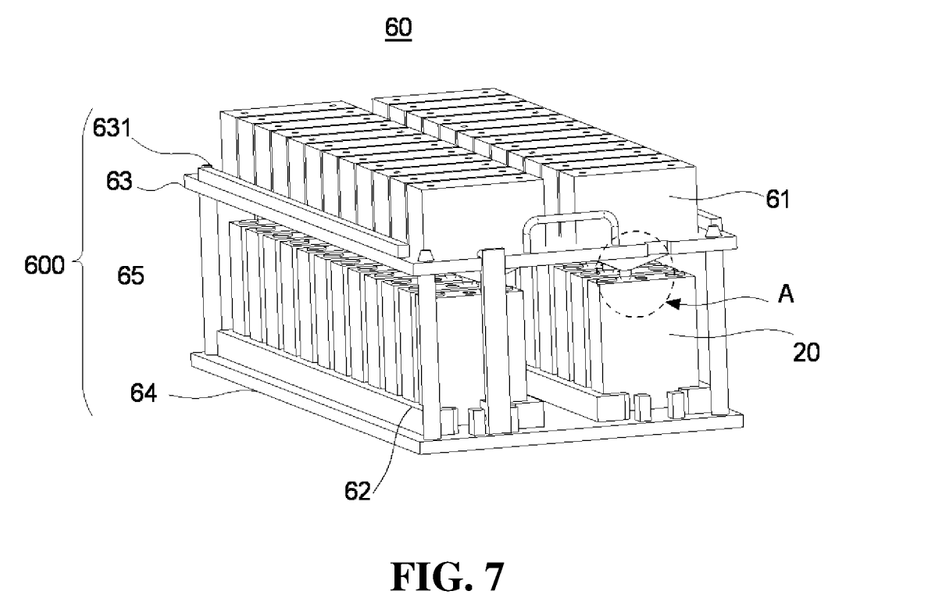
FIG. 7 is a schematic view of a tray clamp according to some embodiments of the present application.

FIG. 7 is a schematic view of a tray clamp according to some embodiments of the present application. Optionally, as shown in FIG. 7, in some embodiments of the present application, the standing device 50 further comprises a tray clamp 60, and the tray clamp 60 is disposed on the conveying apparatus 505 and configured to place the battery cell 20. By placing the battery cell 20 on the tray clamp 60 and placing the tray clamp 60 on the conveying apparatus 505, the movement of the battery cell 20 in the standing device 50 is achieved, that is, the battery cell 20 can be conveyed and transported conveniently by disposing the tray clamp 60.

Figure 8:
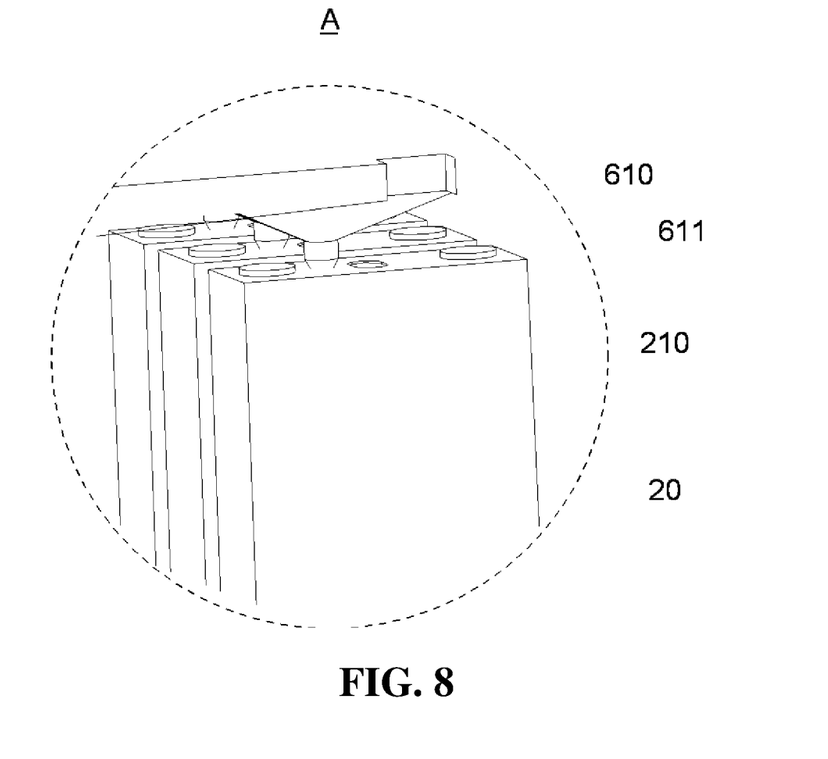
FIG. 8 is a schematic enlarged view of a region A in FIG. 7.

FIG. 8 is a schematic enlarged view of a region A in FIG. 7. Optionally, in some embodiments of the present application, with reference to FIG. 7 and FIG. 8, the tray clamp 60 comprises a liquid injection mechanism 61 and a liquid injection clamp 62. A liquid discharge port 610 of the liquid injection mechanism 61 is configured to align with a liquid injection port 210 of the battery cell 20, so as to inject an electrolyte into the battery cell 20. The liquid injection clamp 62 is configured to clamp the battery cell. In this way, during the standing process of the battery cell 20, the liquid injection mechanism 61 can also inject the electrolyte into the battery cell 20, so that the content of the electrolyte in the battery cell 20 can be increased.

Optionally, the tray clamp 60 may further comprise a mounting bracket 600, and the mounting bracket 600 comprises a first tray 63, a second tray 64, supports 65 for connecting the first tray 63 with the second tray 64, and a first tray reinforcing rib 631. The first tray 63 is provided with a mounting hole for carrying the liquid injection mechanism 61, and the first tray reinforcing rib 631 is configured to enhance the structural strength of the first tray 63. The second tray 64 is configured to carry the battery cell 20, and the liquid injection clamp 62 is configured to clamp and fix the battery cell 20. By disposing the mounting bracket 600, the liquid injection mechanism 61 and the battery cell 20 can be fixed on the mounting bracket 600 to form a whole, thus being convenient for transporting and conveying.

Optionally, the liquid injection clamp 62 is configured to clamp and fix the battery cell 20, and a set of battery cells 20 can be clamped and fixed by a pair of liquid injection clamps 62 disposed oppositely.

The liquid injection mechanism 61 may comprise a plurality of electrolyte buffer cups, wherein each electrolyte buffer cup is filled with an electrolyte for the corresponding battery cell 20, and the electrolyte in the electrolyte buffer cup can enter the liquid injection port 210 through the liquid discharge port 610. Optionally, before the battery cell 20 enters the standing device 50, 30% to 50% of the electrolyte in the electrolyte buffer cup can be injected into the battery cell 20 through the liquid injection mechanism 61, and the remaining electrolyte can be gradually injected during the standing process of the battery cell 20 in the standing device 50. In this way, the battery cell 20 absorbs the electrolyte under the action of pressure, and simultaneously, the electrolyte is continuously injected into the battery cell 20, thus being beneficial for improving the level of absorbing the electrolyte by the battery cell 20, so as to increase the content of the electrolyte in the battery cell 20.

Optionally, in some embodiments of the present application, as shown in FIG. 8, an end of the liquid discharge port 610 close to the liquid injection port 210 is provided with a sealing member 611. For example, the sealing member 611 may be a rubber sealing ring. In this way, the electrolyte can be prevented from leaking from a joint between the liquid discharge port 610 and the liquid injection port 210.

Although the present application has been described with reference to some embodiments, various improvements may be made and components therein may be replaced with equivalents without departing from the scope of the present application. In particular, the technical features mentioned in the embodiments can be combined in any manner as long as there is no structural conflict. The present application is not limited to the specific embodiments disclosed herein, but rather includes all technical solutions falling within the scope of the claims.

What is claimed is:

1. A standing device for letting a battery cell stand, comprising:
    a pressure regulating apparatus;
    a standing cavity;
    a charging cavity, connected to a first end of the standing cavity, the charging cavity being connected to the pressure regulating apparatus;
    a conveying apparatus, penetratingly disposed in the standing cavity and the charging cavity and configured to convey the battery cell; and
    a charging cavity sealing gate, disposed between the charging cavity and the standing cavity, the charging cavity sealing gate being configured to be opened when the pressure in the charging cavity rises to the pressure in the standing cavity, so that the battery cell is conveyed to the standing cavity.

2. The standing device according to claim 1,
    wherein the charging cavity sealing gate is configured to be closed after the battery cell is conveyed to the standing cavity, and the charging cavity is configured to be depressurized after the charging cavity sealing gate is closed;
    the standing device further comprising:
        a charging sealing cover, the charging sealing cover being disposed at an end of the charging cavity away from the standing cavity, and the charging sealing cover being configured to be opened after the pressure in the charging cavity is reduced, so as to put in the battery cell.

3. The standing device according to claim 1, further comprising:
    a discharging cavity, connected to a second end of the standing cavity, the discharging cavity being connected to the pressure regulating apparatus; and
    a discharging cavity sealing gate, disposed between the standing cavity and the discharging cavity, the discharging cavity sealing gate being configured to be opened when the pressure in the discharging cavity rises to the pressure in the standing cavity, so as to convey the battery cell to the discharging cavity.

4. The standing device according to claim 3,
    wherein the discharging cavity sealing gate is configured to be closed after the battery cell is conveyed to the discharging cavity, and the discharging cavity is configured to be depressurized after the discharging cavity sealing gate is closed;
    the standing device further comprising:
        a discharging sealing cover, the discharging sealing cover being disposed at an end of the discharging cavity away from the standing cavity, and the discharging sealing cover being configured to be opened after the pressure in the discharging cavity is reduced, so as to remove the battery cell.

5. The standing device according to claim 3, further comprising:
    a pressure recovery apparatus, the pressure recovery apparatus being in communication with the charging cavity and the discharging cavity respectively, so as to recover high pressure from one of the charging cavity and the discharging cavity to the other one.

6. The standing device according to claim 1, wherein the charging cavity sealing gate comprises:
    a gate body, the gate body being connected to the charging cavity and the standing cavity respectively, and the gate body being provided with a first opening in communication with the charging cavity and the standing cavity; and
    a gate plate, movably disposed on the gate body and corresponding to the first opening, and configured to open or close the first opening.

7. The standing device according to claim 6, wherein the conveying apparatus comprises a first sub-conveying apparatus and a second sub-conveying apparatus, and the first sub-conveying apparatus and the second sub-conveying apparatus are threaded in the charging cavity and the standing cavity respectively, wherein the first sub-conveying apparatus and the second sub-conveying apparatus are disposed at an interval to avoid the gate plate.

8. The standing device according to claim 1, wherein the volume of the standing cavity is 1-20 times the volume of the charging cavity.

9. The standing device according to claim 1, wherein the standing cavity is a segmented structure.

10. The standing device according to claim 1, wherein the charging cavity and the standing cavity are cylindrical.

11. The standing device according to claim 1, further comprising:
   a tray clamp, disposed on the conveying apparatus and configured to place the battery cell.

12. The standing device according to claim 11, wherein the tray clamp comprises:
   a liquid injection mechanism, a liquid discharge port of the liquid injection mechanism being configured to align with a liquid injection port of the battery cell, so as to inject an electrolyte into the battery cell; and
   a liquid injection clamp, the liquid injection clamp being configured to clamp the battery cell.

13. The standing device according to claim 12, wherein an end of the liquid discharge port close to the liquid injection port is provided with a sealing member.

\* \* \* \* \*